United States Patent Office 3,081,337
Patented Mar. 12, 1963

3,081,337
ADAMANT-1-YL MONOESTERS OF DIBASIC ACIDS
Robert Michel Jacob, Ablon-sur-Seine, and Nicole Marie Preau, Paris, France, assignors to Societe des Usines Chimiques Rhone-Poulenc, Paris, France, a French body corporate
No Drawing. Filed Jan. 30, 1961, Ser. No. 85,508
Claims priority, application France Feb. 2, 1960
5 Claims. (Cl. 260—475)

This invention relates to esters having pharmacological activity, and has for its object the provision of new such esters having choleretic activity and pharmaceutical compositions containing them.

The new esters of the present invention are the esters of adamantan-1-ol of the general formula:

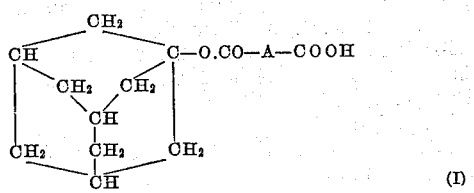

in which A represents a saturated or unsaturated, straight or branched, divalent aliphatic hydrocarbon radical containing two to four carbon atoms, or a divalent mononuclear aromatic radical, and the salts thereof. Preferably A is ethylene, trimethylene, α,β-dimethylethylene, or o-phenylene.

These new compounds possess interesting pharmacological properties. In particular they are powerful choleretics and have a strong effect on the volume as well as the quality of the bile excreted.

According to a feature of the invention, the compounds of Formula I are prepared from adamantan-1-ol by known methods for the esterification of tertiary alcohols, preferably by reacting adamantan-1-ol with an acid anhydride of the formula:

where A is as hereinbefore defined. This reaction is conveniently carried out by heating the reactants to between 50 and 150° C., preferably in a solvent which is an aromatic tertiary amine such as pyridine.

The most valuable salts of the compounds of Formula I are the alkali metal and alkaline earth metal salts and the salts with amines such as ethanolamine. The salts can be prepared by direct action of the compound of Formula I on an alkali metal or alkaline earth metal derivative, such as the hydroxide, carbonate, or bicarbonate, or an amine. This reaction is conveniently carried out in an aqueous or liquid organic medium. The salt obtained can be isolated by conventional methods. When a compound of Formula I is used for therapeutic purposes in the form of a salt, a physiologically acceptable salt such as the sodium or ethanolamine salt should be used; that is to say the beneficial properties of the anion of the salt must not be cancelled or outweighed by the cation.

The following examples illustrate the invention.

Example I

A solution of adamantan-1-ol (15 g.) and succinic hydride (10 g.) in anhydrous pyridine (100 cc.) is boiled under reflux for 77 hours. The mixture is cooled and then the pyridine evaporated on the water-bath under reduced pressure. The blackish residue thus obtained is taken up in ether (150 cc.) and extracted three times with a 4% solution of sodium carbonate (50 cc.) and then with distilled water (2×25 cc.). The combined aqueous phases are decolorised by rapid boiling with animal charcoal and filtered hot. The solution obtained is then cooled to 0° C. and acidified with 35% hydrochloric acid (20 cc.). The acid liberated is extracted with ether (5×50 cc.) and the organic solution thus obtained is dried over sodium sulphate and evaporated on the water-bath. There is thus obtained adamant-1-yl β-carboxypropionate (11 g.) which, after recrystallisation from methanol, forms a white crystalline powder melting at 80° C.

Adamantan-1-ol, used as starting material, is prepared by the hydrolysis of 1-bromo-adamantane, prepared according to the method of Stetter, Schwarz, and Hirschhorn, Berichte, 92, 1629 (1959).

Example II

A mixture of adamantan-1-ol (5 g.) and phthalic anhydride (5 g.) in anhydrous pyridine (50 cc.) is boiled for about 5 days. The mixture is treated as in Example I and there is obtained, after recrystallisation from aqueous ethanol (2:3), adamant-1-yl o-carboxybenzoate (5 g.), M.P. 149° C.

Example III

A mixture of adamantan-1-ol (20 g.) and glutaric anhydride (17 g.) in anhydrous pyridine (250 cc.) is boiled for about 9 days and worked up as in Example I.

The ethereal solution of the acid obtained is washed with water until excess glutaric acid which it contains is completely eliminated. After drying and evaporation of the solvent, adamant-1-yl γ-carboxy-n-butyrate (12.6 g.) is obtained, M.P. 55° C.

Example IV

A mixture of adamantan-1-ol (30 g.) and 2,3-dimethylsuccinic anhydride (27 g.), M.P. 87° C., in anhydrous pyridine (200 cc.) is boiled for about 9 days. The mixture is worked up as in the preceding example, and adamant-1-yl β-carboxy-α,β-dimethyl-propionate (16 g.) is obtained, M.P. 75° C.

Example V

A suspension of adamant-1-yl β-carboxypropionate (1.752 g.) in distilled water (25 cc.) is treated drop by drop with a solution of sodium bicarbonate (0.583 g.) in distilled water (40 cc.) at 35° C. The mixture is stirred for 15 minutes after the addition is completed. A clear pale yellow solution is obtained which is filtered and freeze-dried. The sodium salt of adamant-1-yl β-carboxypropionate (2.887 g.) is thus obtained as a white powder, very soluble in water.

Example VI

A solution of monoethanolamine (7 g.) in ethyl acetate (100 cc.) is added with stirring to a hot solution of crude adamant-1-yl β-carboxy-α,β-dimethyl-propionate (36.5 g.) in ethyl acetate (250 cc.). The clear, hot solution precipitates on cooling the ethanolamine salt of adamant-1-yl β-carboxy-α,β-dimethylpropionate (24.5 g.), which melts at 120° C. after recrystallisation from butanone, and is very soluble in water.

The invention includes within its scope pharmaceutical compositions comprising at least one compound of general Formula I or a physiologically acceptable salt thereof in association with a significant amount of a pharmaceutical carrier. These compositions may be solid, semi-solid or liquid and may be prepared in a form suitable for oral, rectal, or parenteral administration.

Solid compositions for oral administration are most frequently tablets, pills, powders or granules. In these compositions one or more of the active compounds of the invention is (or are) mixed with one or more pharmaceutically acceptable diluents of the kind commonly used in the art for making solid compositions for oral administration, such as calcium carbonate, starch, alginic acid or lactose. These compositions can also contain substances other than diluents, for example, a lubricating agent such as magnesium stearate.

For rectal administration, the products of the invention can be put in suppositories made of cocoa butter or a suitable wax base.

Liquid compositions for oral administration include pharmaceutically acceptable emulsions, solutions, suspensions, syrups and elixirs. The emulsions, solutions and suspensions may contain diluents of the kind commonly used in this type of formulation, such as water or liquid paraffin. The syrups and elixirs may be made with a conventional syrup base, made, for example, with sucrose, or with a conventional elixir base respectively. These liquid compositions can also contain substances other than diluents, for example wetting agents, sweetening agents or flavourings.

The compositions for parenteral administration include sterile aqueous or non-aqueous solutions, suspensions, or emulsions. As non-aqueous solvent or vehicle, any conventional material, for example propylene glycol, polyethylene glycols, vegetable oils, especially olive oil, and injectable organic esters, for example, ethyl oleate, can be used. These compositions can also contain wetting, emulsifying and dispersing agents. Sterilisation can be carried out in several ways, for example, using a bacteriological filter, by incorporating sterilising agents in the compositions, by radiation, or by heating. Such compositions can also be prepared in the form of solid sterile compositions which can be dissolved, or put in suspension, at the moment of use in sterile water or some other sterile injectable medium.

The daily dose depends on the therapeutic effect desired, the route of administration, and the duration of treatment. Generally, the dose is between 100 and 500 milligrams of active product per day.

The following examples illustrate some useful medicinal compositions.

*Example VII*

Tablets are prepared weighing 250 mg. each and containing:

| | |
|---|---|
| Adamant-1-yl β-carboxypropionate _____ mg__ | 200 |
| Starch _____ mg__ | 35 |
| Magnesium stearate _____ mg__ | 10 |
| Talc _____ mg__ | 5 |

*Example VIII*

Tablets weighing 250 mg. each are prepared containing:

| | |
|---|---|
| The sodium salt of adamant-1-yl β-carboxypropionate _____ mg__ | 200 |
| Starch _____ mg__ | 35 |
| Magnesium stearate _____ mg__ | 10 |
| Talc _____ mg__ | 5 |

*Example IX*

An injectable solution is prepared as follows:

A normal aqueous solution of monoethanolamine (50 cc.) is added to adamant-1-yl γ-carboxy-n-butyrate (12.5 g.). The solution is made up to 250 cc. with distilled water. The clear solution obtained having a pH of 6.5–7 is sterilised by filtration through a Seitz sterilising filter and then placed in sterile conditions in ampoules, 2 cc. per ampoule.

We claim:
1. A member of the class consisting of a compound of the formula:

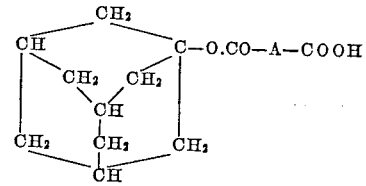

where A is a member of the class consisting of alkylene containing 2 to 4 carbon atoms, and phenylene, its alkali metal salts, its alkaline earth metal salts and its salts with physiologically acceptable lower alkanolamines.
2. The compound adamant-1-yl β-carboxypropionate.
3. The compound adamant-1-yl o-carboxybenzoate.
4. The compound adamant-1-yl γ-carboxy-n-butyrate.
5. The compound adamant-1-yl β-carboxy-α,β-dimethyl-propionate.

No references cited.